(No Model.)
L. B. WATKINS.
MECHANICAL POWER.
No. 404,136. Patented May 28, 1889.
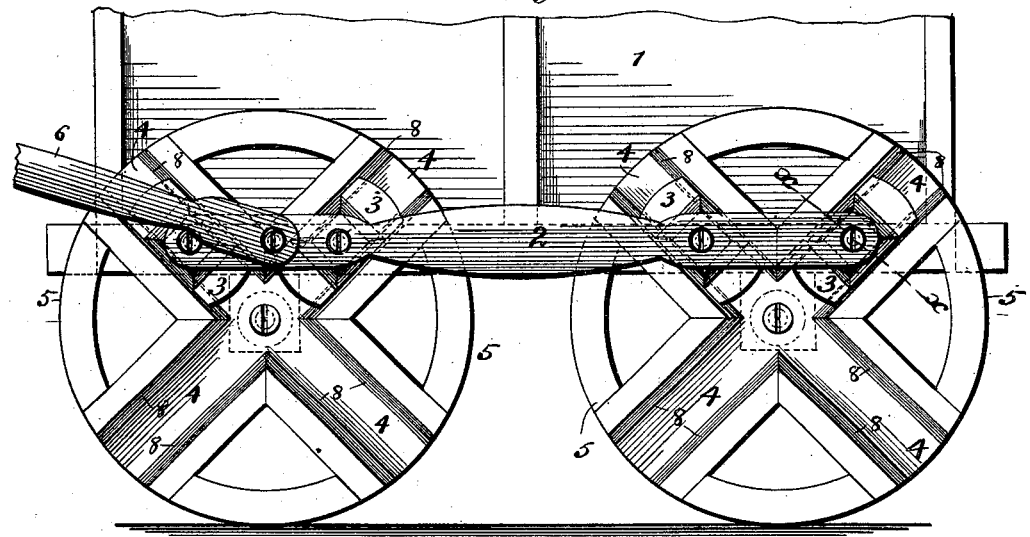
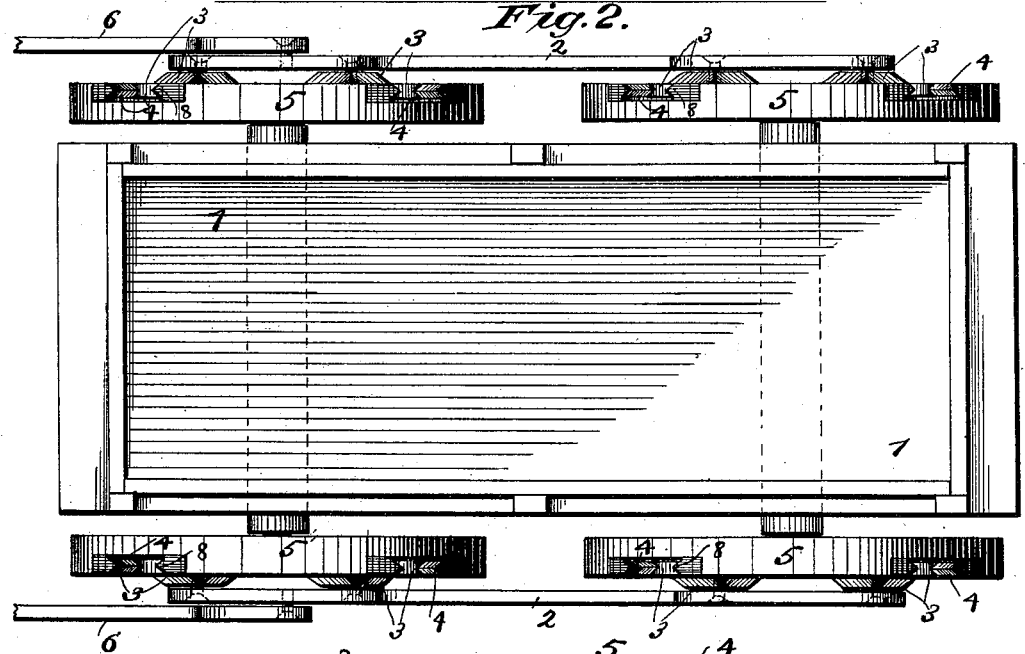
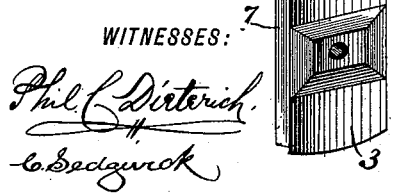
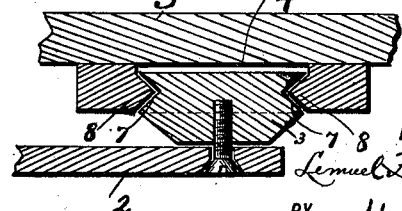
WITNESSES:
INVENTOR: Lemuel B. Watkins
BY Munn & Co.
ATTORNEYS.

UNITED STATES PATENT OFFICE.

LEMUEL B. WATKINS, OF WASHINGTON, LOUISIANA.

MECHANICAL POWER.

SPECIFICATION forming part of Letters Patent No. 404,136, dated May 28, 1889.

Application filed September 7, 1888. Serial No. 284,800. (No model.)

*To all whom it may concern:*

Be it known that I, LEMUEL B. WATKINS, of Washington, in the parish of St. Landry and State of Louisiana, have invented a new and Improved Mechanical Power, of which the following is a full, clear, and exact description.

This invention relates to driving-gear mechanism, and has for its object to provide a driving-gear mechanism by means of which friction of the parts is diminished, less power is required than with the ordinary driving-gear mechanism, and greater speed obtained.

The invention consists in a driving-gear mechanism constructed and arranged as hereinafter described and claimed.

Reference is to be had to the accompanying drawings, forming a part of this specification, in which similar figures of reference indicate corresponding parts in all the views.

Figure 1 is a side view of a vehicle, showing the invention applied. Fig. 2 is a plan view thereof. Fig. 3 is a detail of one of the parts detached, and Fig. 4 is a detail in horizontal section on line $x$ $x$ in Fig. 1.

The invention may be used with different kinds of machinery employing a crank mechanism.

As here shown, it is applied to a vehicle, 1, and is constructed with a connecting-rod, 2, having pivoted at its end slides 3, located in grooves 4, formed in the wheels 5 of the vehicle 1 and crossing each other. The connecting-rod 2 has pivoted thereto a pitman, 6, operated by a piston-rod or other means. In the present instance the pitman 6 would be connected with the mechanism of an engine.

To diminish the friction of the slides 3 in grooves 4, the slides 3 are formed with V-shaped grooves 7, which engage V-shaped edges 8 on the sides of the grooves 4. In the operation of the device the slides 3 on each wheel serve as two centers, the power acting upon them alternately, and the moment that it leaves one of these centers being transferred to the other. The power will act on the V-shaped edges when they are at an incline, thereby causing but little friction and less power to operate the parts.

Having thus fully described my invention, I claim as new and desire to secure by Letters Patent—

A driving-gear mechanism consisting of wheels formed with diametrical grooves crossing each other and having their sides provided with V-shaped edges, in combination with a connecting-rod having slides pivoted thereto and located in the diametrical grooves, said slides having V-shaped grooves engaging the V-shaped edges of the diametrical grooves, and a pitman pivoted to the connecting-rod, substantially as shown and described.

LEMUEL B. WATKINS.

Witnesses:
   JAS. M. ROBERTS,
   J. A. TRAINOR,
   M. D. KAVANAGH.